(12) United States Patent
Campbell (10) Patent No.: US 9,821,709 B1
(45) Date of Patent: Nov. 21, 2017

(54) WINDOW-HANGING VEHICLE-LOCATING DEVICE

(71) Applicant: Thomas Campbell, Levittown, NY (US)

(72) Inventor: Thomas Campbell, Levittown, NY (US)

(*) Notice: Subject to any disclaimer, the term of this patent is extended or adjusted under 35 U.S.C. 154(b) by 0 days.

(21) Appl. No.: 15/628,734

(22) Filed: Jun. 21, 2017

(51) Int. Cl.
*G08B 1/08* (2006.01)
*B60Q 1/48* (2006.01)
*G09F 7/18* (2006.01)

(52) U.S. Cl.
CPC .............. *B60Q 1/482* (2013.01); *B60Q 1/48* (2013.01); *G09F 2007/1865* (2013.01)

(58) Field of Classification Search
CPC .......... B60Q 1/0011; B60Q 7/02; G09F 17/00
USPC ......... 340/539.11, 539.32, 988, 426.17, 468; 116/28 R, 209
See application file for complete search history.

(56) References Cited

U.S. PATENT DOCUMENTS

| | | | |
|---|---|---|---|
| 3,046,934 A | 7/1962 | Swezy | |
| 5,089,803 A | 2/1992 | Bohn | |
| 5,233,938 A * | 8/1993 | Lalo | B60R 13/005 116/173 |
| 5,786,758 A * | 7/1998 | Bullock | B60Q 1/482 116/202 |
| D427,108 S | 6/2000 | Fisher | |
| 6,295,945 B1 | 10/2001 | Amanize | |
| 6,298,803 B1 * | 10/2001 | Gregg | G09F 17/00 116/209 |
| 6,580,368 B1 * | 6/2003 | Jacobs | B60Q 1/482 116/209 |
| 7,119,679 B1 * | 10/2006 | Crom | B60Q 1/482 340/425.5 |
| 7,878,139 B1 | 2/2011 | McKinley | |
| 9,395,217 B1 * | 7/2016 | Gaor | G09F 17/00 |
| 2004/0155170 A1 | 8/2004 | Thompson | |
| 2008/0061968 A1 * | 3/2008 | Hollimon | G08G 1/127 340/539.32 |
| 2016/0379532 A1 * | 12/2016 | Tomlinson | G09F 17/00 116/173 |

FOREIGN PATENT DOCUMENTS

WO    2004044876    5/2004

\* cited by examiner

*Primary Examiner* — Phung Nguyen
(74) *Attorney, Agent, or Firm* — Kyle A. Fletcher, Esq.

(57) ABSTRACT

The window-hanging vehicle-locating device is configured for use with a vehicle. The window-hanging vehicle-locating device is removably attached to a window of the vehicle. The window-hanging vehicle-locating device is an optical signaling device that is attached to the vehicle for the purpose of visually locating the position of the vehicle. The window-hanging vehicle-locating device is remotely controlled in a manner that allows for the identification of a specific vehicle within parking lot. The window-hanging vehicle-locating device comprises a clip, a telescopic pole, a flag, a lamp, a remote interface circuit, and a user control. The flag and the lamp attach to the telescopic pole. The telescopic pole and the remote interface circuit attach to the clip. The clip attaches the window-hanging vehicle-locating device to the superior edge of the window. The user control remotely controls the operation of the window-hanging vehicle-locating device.

12 Claims, 6 Drawing Sheets

COTTER PIN

FIG. 8

SPRING LOADED
BALL LOCK

FIG. 9

G SNAP COLLAR

FIG. 10

SPLIT COLLAR LOCK

FIG. 11

THREADED CLUTCH

FIG. 12

INTERNAL CAM LOCK

WINDOW-HANGING VEHICLE-LOCATING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles, more specifically, an optical signaling device for locating a parked car.

SUMMARY OF INVENTION

The window-hanging vehicle-locating device is configured for use with a vehicle. The vehicle is further defined with a window. The window is further defined with a superior edge. The window can be raised and lowered within the vehicle. The window-hanging vehicle-locating device is removably attached to the window. The window-hanging vehicle-locating device is an optical signaling device that is attached to the vehicle for the purpose of visually locating the position of the vehicle. The window-hanging vehicle-locating device is remotely controlled in a manner that allows for the identification of a specific vehicle within parking lot. The window-hanging vehicle-locating device comprises a clip, a telescopic pole, a flag, a lamp, a remote interface circuit, and a user control. The flag and the lamp attach to the telescopic pole. The telescopic pole and the remote interface circuit attach to the clip. The clip attaches the window-hanging vehicle-locating device to the superior edge of the window. The user control remotely controls the operation of the window-hanging vehicle-locating device.

These together with additional objects, features and advantages of the window-hanging vehicle-locating device will be readily apparent to those of ordinary skill in the art upon reading the following detailed description of the presently preferred, but nonetheless illustrative, embodiments when taken in conjunction with the accompanying drawings.

In this respect, before explaining the current embodiments of the window-hanging vehicle-locating device in detail, it is to be understood that the window-hanging vehicle-locating device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the window-hanging vehicle-locating device.

It is therefore important that the claims be regarded as including such equivalent construction insofar as they do not depart from the spirit and scope of the window-hanging vehicle-locating device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
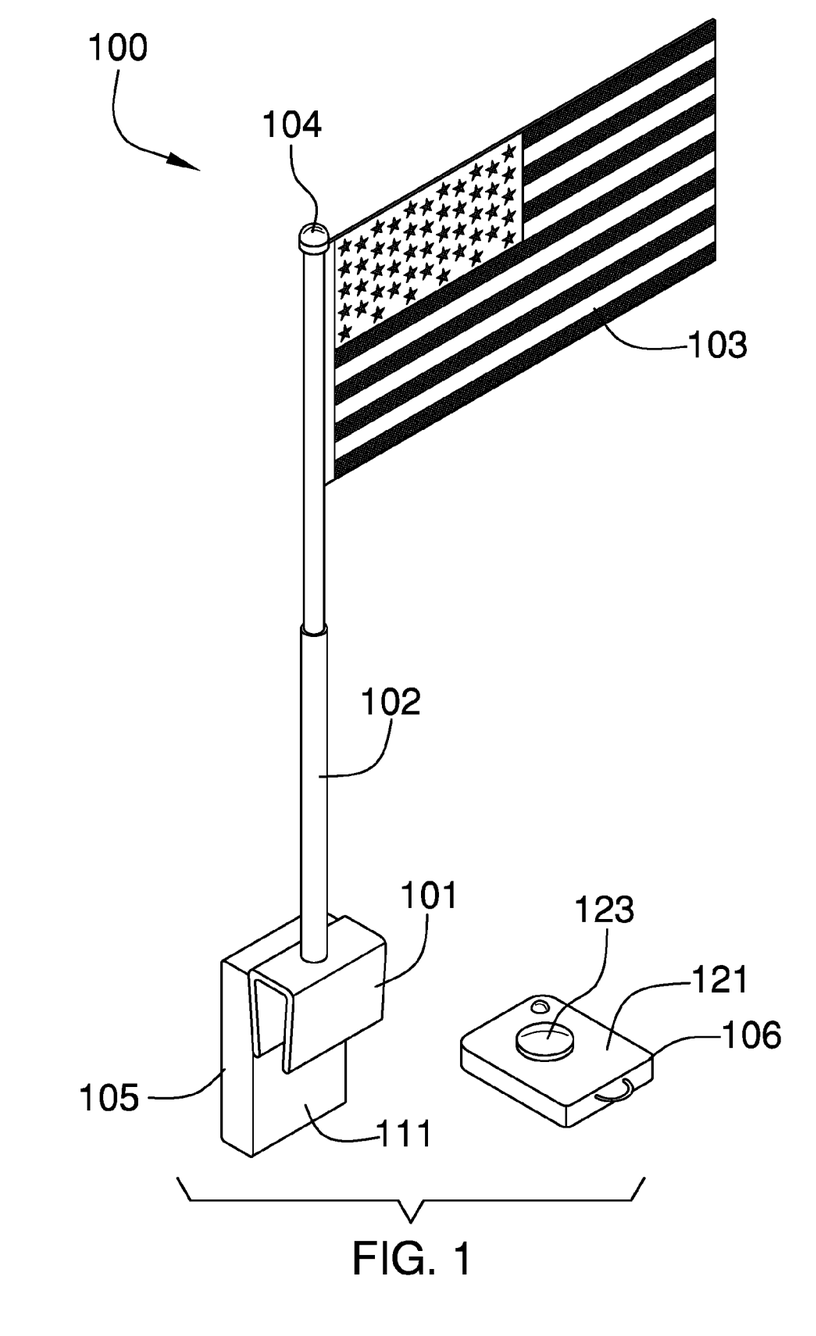
FIG. 1 is a perspective view of an embodiment of the disclosure.
Figure 2:
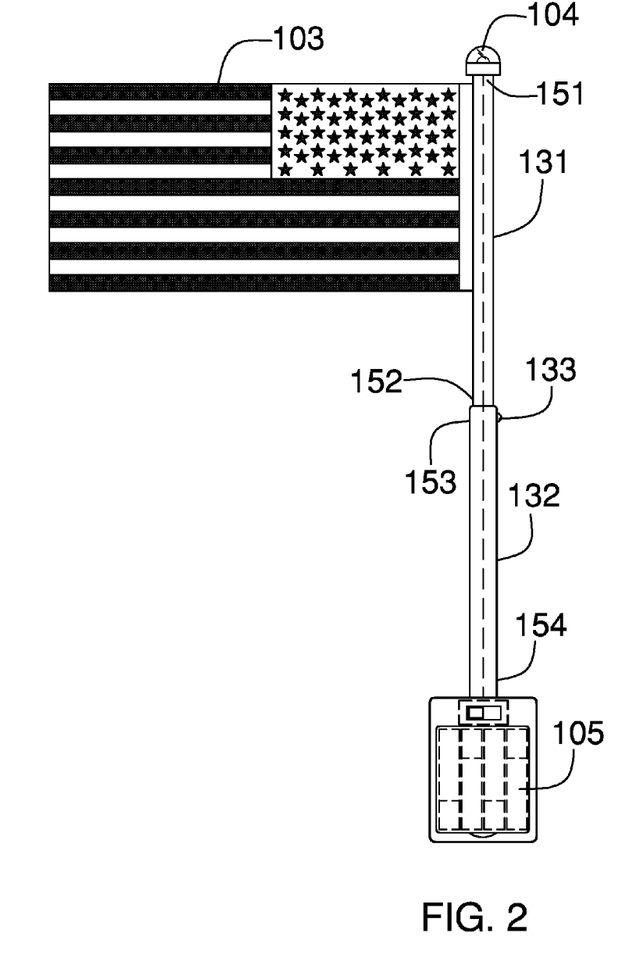
FIG. 2 is a front view of an embodiment of the disclosure.
Figure 3:
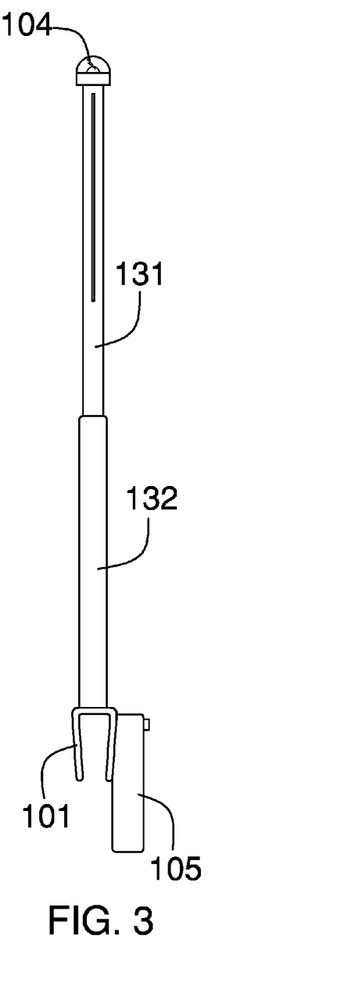
FIG. 3 is a side view of an embodiment of the disclosure.
Figure 4:
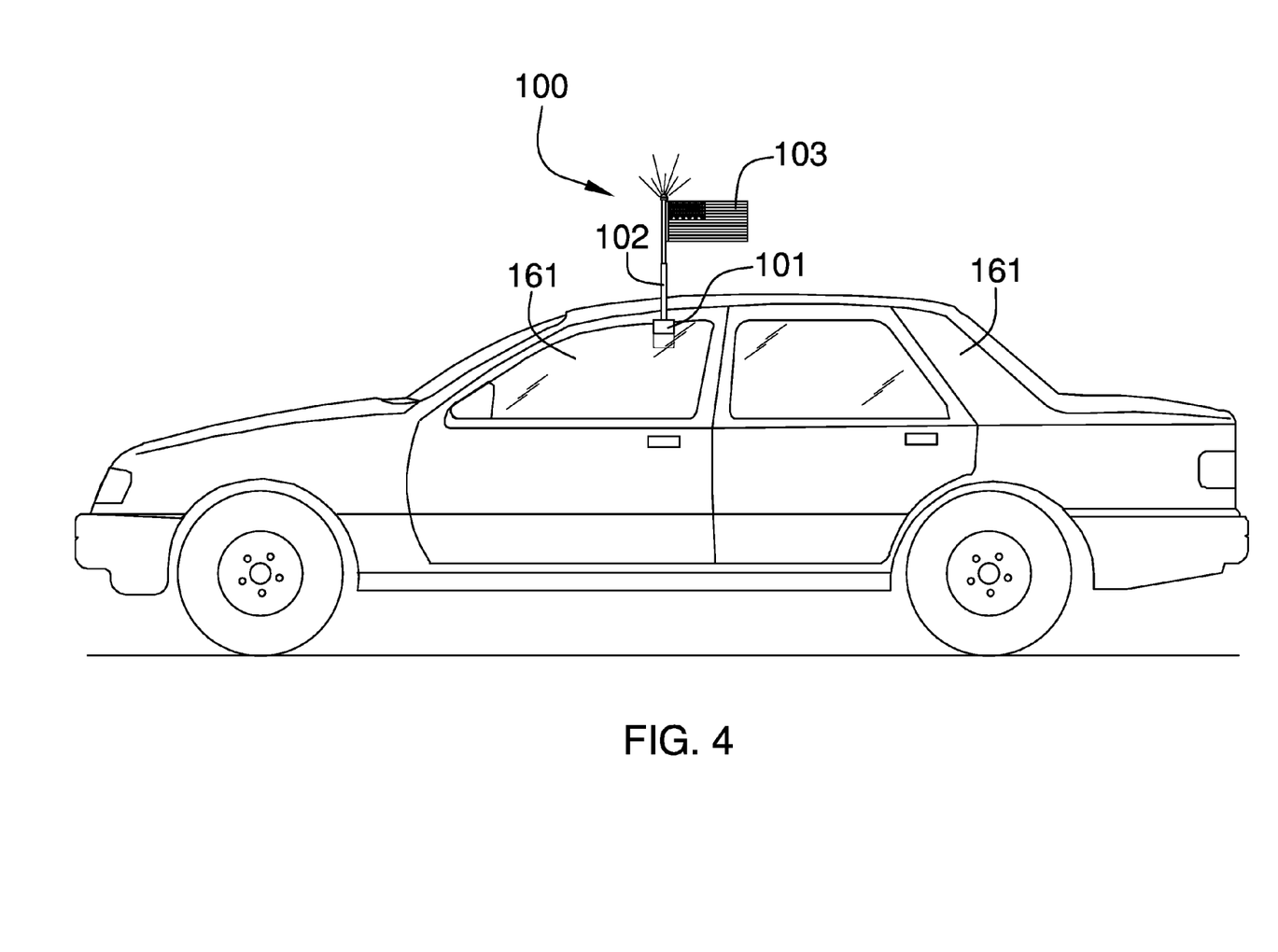
FIG. 4 is an in-use view of an embodiment of the disclosure.
Figure 5:
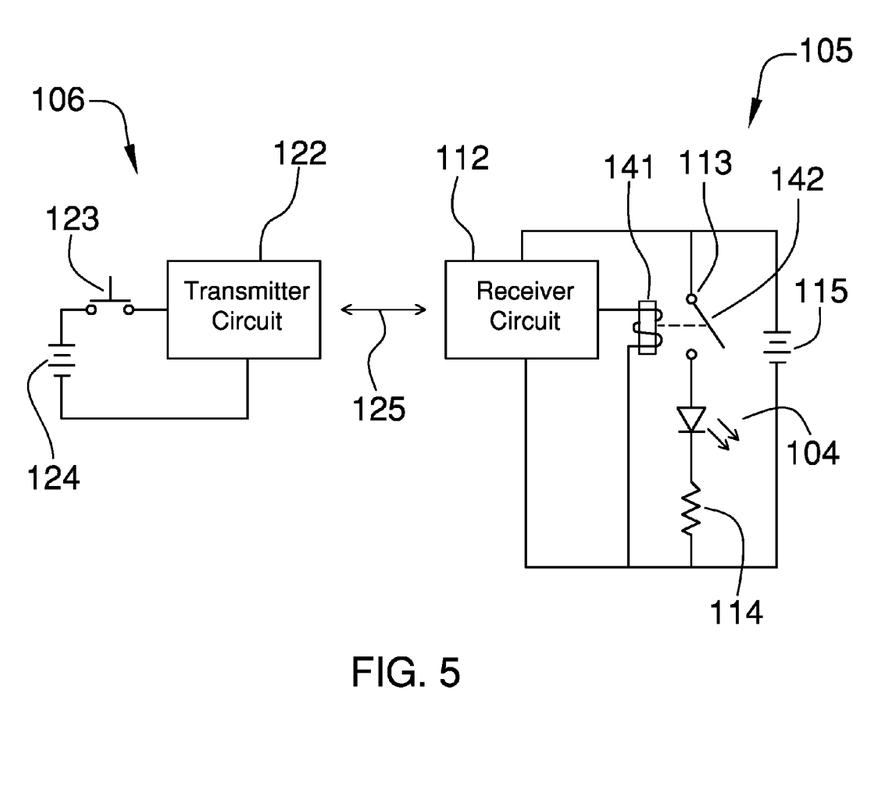
FIG. 5 is a schematic view of an embodiment of the disclosure.
Figure 6:
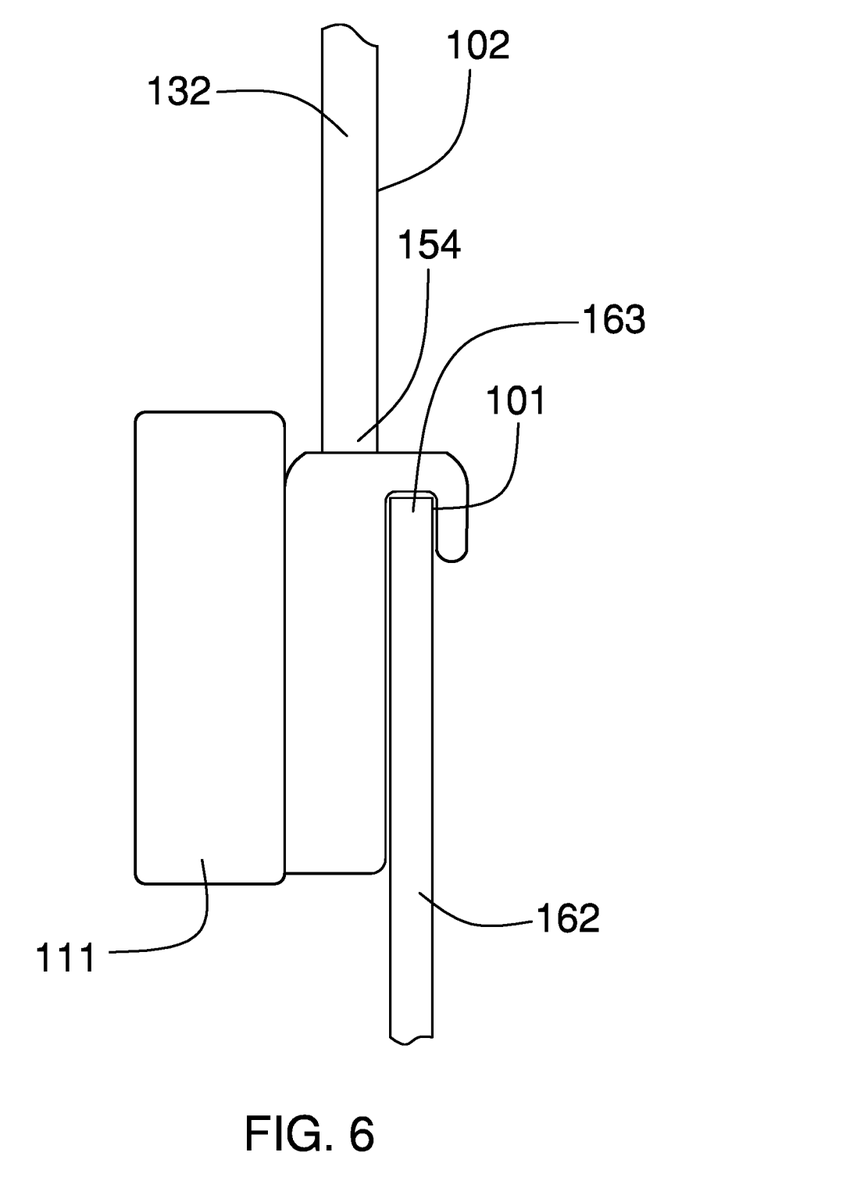
FIG. 6 is a detail view of an embodiment of the disclosure.
Figure 7:
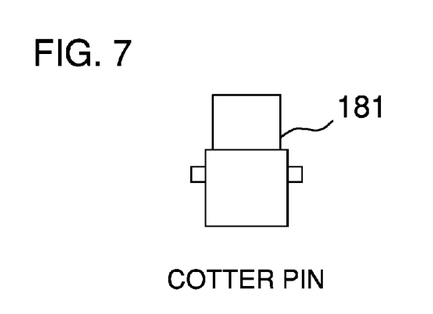
FIG. 7 is a detail view of an embodiment of the disclosure.
Figure 8:
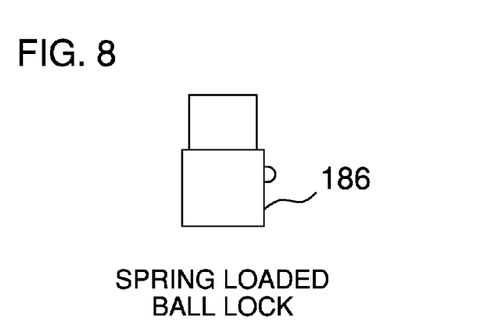
FIG. 8 is a detail view of an embodiment of the disclosure.
Figure 9:
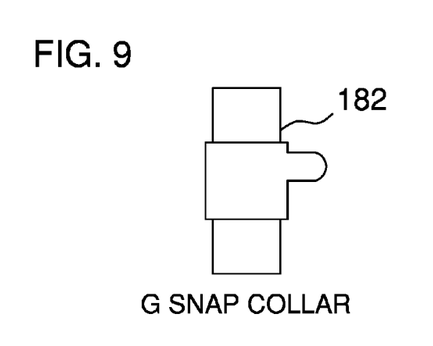
FIG. 9 is a detail view of an embodiment of the disclosure.
Figure 10:
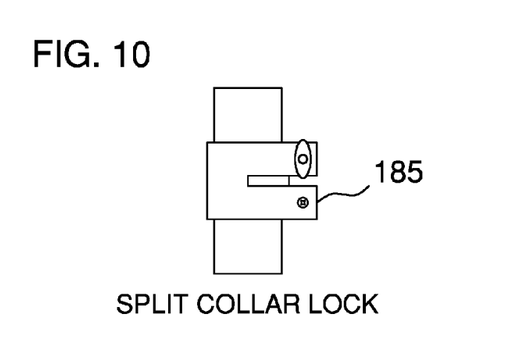
FIG. 10 is a detail view of an embodiment of the disclosure.
Figure 11:
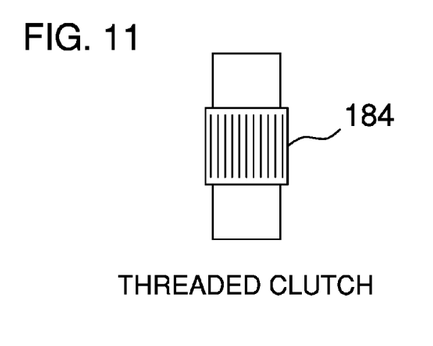
FIG. 11 is a detail view of an embodiment of the disclosure.
Figure 12:
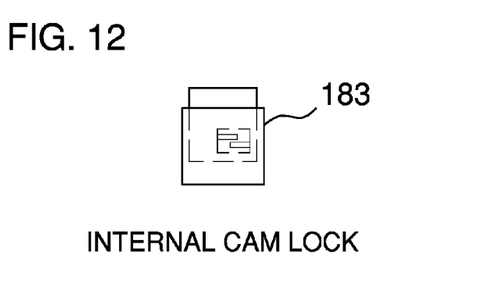
FIG. 12 is a detail view of an embodiment of the disclosure.

Detailed reference will now be made to one or more potential embodiments of the disclosure, which are illustrated in FIGS. 1 through 12.

The window-hanging vehicle-locating device 100 (hereinafter invention) is configured for use with a vehicle 161. The vehicle 161 is further defined with a window 162. The window 162 is further defined with a superior edge 163. The window 162 can be raised and lowered within the vehicle 161. The invention 100 is removably attached to the window 162. The invention 100 is an optical signaling device that is attached to the vehicle 161 for the purpose of visually locating the position of the vehicle 161. The invention 100 is remotely controlled in a manner that allows for the identification of a vehicle 161 within parking lot. The invention 100 comprises a clip 101, a telescopic pole 102, a flag 103, a lamp 104, a remote interface circuit 105, and a user control 106. The flag 103 and the lamp 104 attach to the telescopic pole 102. The telescopic pole 102 and the remote interface circuit 105 attach to the clip 101. The clip 101 attaches the invention 100 to the superior edge 163 of the window 162. The user control 106 remotely controls the operation of the invention 100.

The clip 101 is a mechanical device that attaches the invention 100 to the superior edge 163 of the window 162. The clip 101 is a hook. To attach the clip 101 to the superior edge 163 of the window 162, the window 162 is lowered and the clip 101 is hooked over the superior edge 163 of the window 162. The window 162 is then raised to secure the clip 101 to the window 162.

The telescopic pole 102 is a hollow extendable structure: 1) that raises the lamp 104 above the roof of the vehicle 161; and 2) to which the flag 103 attaches in the manner of a flag pole for display. The telescopic pole 102 comprises a first shaft 131, a second shaft 132, and a detent 133. The first shaft 131 is further defined with a first end 151 and a second end 152. The second shaft 132 is further defined with a third end 153 and a fourth end 154.

The telescopic pole 102 further comprises a second shaft 132, a first shaft 131 and a detent 133. The detent 133 connects the first shaft 131 to the second shaft 132. The second shaft 132 is a hollow first structure that is further defined with an inner diameter. The first shaft 131 is a second structure that is further defined with an outer diameter. The outer diameter of the first shaft 131 is less than the inner diameter of the second shaft 132 such that the first shaft 131 can be inserted into the second shaft 132 in a telescopic manner. This telescopic arrangement of the telescopic pole 102 allows the length of the telescopic pole 102 to be adjusted by adjusting the relative position of the first shaft 131 within the second shaft 132.

The position of the second shaft 132 relative to the first shaft 131 is held in position using the detent 133. The detent 133 is a mechanical device that connects and secures the first shaft 131 to the second shaft 132. As shown most clearly in FIG. 7 through 12, the detent 133 is selected from the group consisting of a cotter pin 181, a G snap collar 182, a cam lock collar 183, a threaded clutch 184, a split collar lock 185, or a spring-loaded ball lock 186.

The first end 151 is the superior end of the first shaft 131 during normal use of the invention 100. The second end 152 is the inferior end of the first shaft 131. The third end 153 is the superior end of the second shaft 132. The fourth end 154 is the inferior end of the second shaft 132.

The lamp 104 attaches to the first end 151 of the first shaft 131. The fourth end 154 attaches to the superior surface of the clip 101 such that the telescopic pole 102 projects perpendicularly away from the clip 101 in the superior direction.

The attachment of a flag 103 to a pole is well-known and documented in the mechanical arts. The telescopic pole 102 is a telescopic structure. The flag 103 is a sheeting material that attaches to the telescopic pole 102 using a single edge of the flag 103. The flag 103 acts as a visible marker that can be used to identify the vehicle 161.

The lamp 104 is a light that is illuminated by the remote interface circuit 105. The lamp 104 generates a light that draws attention to the vehicle 161. The wiring that connects the lamp 104 to the remote interface circuit 105 is threaded through the interior space of the telescopic pole 102. In the first potential embodiment of the disclosure, the lamp 104 is a readily and commercially available LED.

The remote interface circuit 105 is an electrical circuit that controls the operation of the lamp 104. The remote interface circuit 105 forms a wireless connection 125 with the user control 106. Upon receipt of a signal from the user control 106 the remote interface circuit 105 illuminates the lamp 104. The remote interface circuit 105 comprises a receiver housing 111, a receiver circuit 112, a relay 113, and a limit resistor 114.

The receiver housing 111 is a rigid casing within which the balance of the remote interface circuit 105 is contained. The receiver housing 111 is formed with all necessary apertures and form factors necessary to allow the receiver housing 111 to accommodate the use and operation of the remote interface circuit 105.

The receiver circuit 112 is a readily and commercially available radio frequency receiver that is used to receive a signal transmitted by the user control 106. The relay 113 is a readily and commercially available electrical relay 113. When the receiver circuit 112 energizes the relay coil 141, the relay switch 142 is closed thereby powering and illuminating the lamp 104. The limit resistor 114 is a resistor that limits the flow of electric current through the lamp 104. The receiver battery 115 is a readily and commercially available battery. The receiver battery 115 provides electrical power for the operation of the receiver circuit 112, the relay 113, and the lamp 104.

The relay coil 141 is the element of the relay 113 which is energized by the receiver circuit 112. Energizing the relay coil 141 closes the relay switch 142. The relay switch 142 is an electrical switch that completes a circuit between the receiver battery 115 and the lamp 104.

Within the remote interface circuit 105 the transmitter circuit 122 is wired into the relay coil 141 in order to energize the relay coil 141. The relay switch 142 is wired in series between the receiver battery 115 and the anode of the LED that forms the lamp 104. The limit resistor 114 is wired in series between the cathode of the LED that forms the lamp 104 and the negative terminal of the receiver battery 115.

The user control 106 is a handheld electrical device that transmits a wireless signal to the remote interface circuit 105. The user control 106 comprises a transmitter housing 121, a transmitter circuit 122, a switch 123, and a transmitter battery 124. The remote interface circuit 105 and the user control 106 combine to form a wireless connection 125.

The transmitter housing 121 is a rigid casing within which the balance of the user control 106 is contained. The transmitter housing 121 is formed with all necessary apertures and form factors necessary to allow the transmitter housing 121 to accommodate the use and operation of the user control 106.

The transmitter circuit 122 is a readily and commercially available radio frequency transmitter that is used to transmit a signal to the receiver circuit 112 of the remote interface circuit 105. The signal transmitted by the transmitter circuit 122 initiates the illumination of the lamp 104 by the remote interface circuit 105. The switch 123 is a readily and commercially available normally open momentary switch. The switch 123 completes a circuit between the transmitter battery 124 and the transmitter circuit 122 that: 1) powers the transmitter circuit 122 such that the transmitter sends the signal over the wireless connection 125 to the receiver circuit 112. The transmitter battery 124 is a readily and commercially available battery. The transmitter battery 124 provides electrical power of the operation of the transmitter battery 124. The wireless connection 125 refers to the communication channel created between the transmitter circuit 122 and the receiver circuit 112.

Within the user control 106 the switch 123 is wired in series between the transmitter circuit 122 and the transmitter battery 124.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Battery: As used in this disclosure, a battery is a container consisting of one or more cells, in which chemical energy is converted into electricity and used as a source of power.

Control System: As used in this disclosure, a control system is a first device or system that manages and regulates the behavior or operation of a second device or system.

Detent: As used in this disclosure, a detent is a device for attaching a first object to a second object in a detachable manner such that: 1) the position of the first object relative to the second object is adjustable; and, 2) the first object is attached to the second object in a detachable manner.

Diode: As used in this disclosure, a diode is a two terminal semiconductor device that allows current flow in only one direction. The two terminals are called the anode and the cathode. Electric current is allowed to pass from the anode to the cathode.

Flag: As used in this disclosure, a flag is a textile or sheeting material that attached by one edge to a pole or a rope. In general usage, a flag will display an image that often contains some form of symbolic meaning or message. This definition maps to the common patent classification definitions and is therefore explicitly intended to include flag like objects commonly referred to as a "banner".

Flag Pole: As used in this disclosure, a flag pole is a shaft to which a flag is attached.

Form Factor: As used in this disclosure, the term form factor refers to the size and shape of an object.

Handheld: As used in this disclosure, when referring to an item or device, handheld means that the item or device is small and light enough to be operated while a person holds the item or device in their hands.

Hook: As used in this disclosure, a hook is an object that is curved or bent at an angle such that items can be hung on or caught by the object.

Housing: As used in this disclosure, a housing is a rigid casing that encloses and protects one or more devices.

Inferior: As used in this disclosure, the term inferior refers to a directional reference that is parallel to and in the same direction as the force of gravity.

Inner Diameter: As used in this disclosure, the term inner diameter is used in the same way that a plumber would refer to the inner diameter of a pipe.

Interface: As used in this disclosure, an interface is a physical or virtual boundary that separates two different systems across which information is exchanged.

Lead: As used in this disclosure, a lead is a conductor that is physically used to electrically connect an electrical component into a larger circuit assembly.

LED: As used in this disclosure, an LED is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

Light: As used in this disclosure, a light is an electrical device that generates visible light to illuminate objects so they can be seen.

Limit Resistor: As used in this disclosure, a limit resistor is an electrical resistor that is used to limit the flow of electric current through an electrical circuit.

Logic Circuit: As used in this disclosure, a logic circuit is non-programmable electrical device that receives one or more digital or analog inputs and uses those digital or analog inputs to generate one or more digital or analog outputs.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Momentary Switch: As used in this disclosure, a momentary switch is a biased switch in the sense that the momentary switch has a baseline position that only changes when the momentary switch is actuated (for example when a pushbutton switch is pushed). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Outer Diameter: As used in this disclosure, the term outer diameter is used in the same way that a plumber would refer to the outer diameter of a pipe.

Personal Data Device: As used in this disclosure, a personal data device is a handheld device that is used for managing personal information and communication. Examples of personal data device include, but are not limited to, cellular phones, tablets and smart phones.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch. Within this disclosure, a transistor can be configured to perform the switching functions of the relay and would be a suitable replacement for the relay. For this reason, transistors are explicitly in this definition of a relay.

Remote Control: As used in this disclosure, remote control means the establishment of control of a device from a distance. Remote control is generally accomplished through the use of an electrical device that generates electrically based control signals that are transmitted via radio frequencies or other means to the device.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will have a voltage across its terminals.

Superior: As used in this disclosure, the term superior refers to a directional reference that is parallel to and in the opposite direction of the force of gravity.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Telescopic: As used in this disclosure, telescopic is an adjective that describes an object made of sections that fit or slide into each other such that the object can be made longer or shorter by adjusting the relative positions of the sections.

Transistor: As used in this disclosure, a transistor is a general term for a three terminal semiconducting electrical that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. Transistor often are operated as a switch. When a voltage is applied to the base, current will flow into the base and the transistor will act like a closed switch allowing current to flow from the collector to the emitter. When the voltage is removed from the base, the transistor will act like an open switch disrupting current flow from the collector to the emitter.

Vehicle: As used in this disclosure, a motorized vehicle is a device that is used for transporting passengers, goods, or equipment. The term motorized vehicle refers to a vehicle can move under power provided by an electric motor or an internal combustion engine.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 12 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An optical signaling device comprising:
a clip, a telescopic pole, a flag, a lamp, a remote interface circuit, and a user control;
wherein the flag and the lamp attach to the telescopic pole;
wherein the telescopic pole and the remote interface circuit attach to the clip;
wherein the clip attaches the optical signaling device to a superior edge of the window;
wherein the user control remotely controls the operation of the optical signaling device;
wherein the clip is a mechanical device;
wherein the clip attaches the optical signaling device to the superior edge of the window;
wherein the optical signaling device is configured for use with a vehicle;
wherein the vehicle is further defined with a window;
wherein the window is further defined with a superior edge;
wherein the window is raised and lowered within the vehicle;
wherein the optical signaling device is removably attached to the window;
wherein the optical signaling device visually identifies a position of the vehicle;
wherein the clip is a hook;
wherein the window is lowered and the clip is hooked over the superior edge of the window;
wherein the window is then raised to secure the clip to the window;
wherein the telescopic pole is a hollow extendable structure;
wherein the telescopic pole raises the lamp above the roof of the vehicle;
wherein the flag attaches to the telescopic pole;
wherein the telescopic pole comprises a first shaft, a second shaft, and a detent;
wherein the first shaft is further defined with a first end and a second end;
wherein the second shaft is further defined with a third end and a fourth end;
wherein the detent connects the second shaft to the first shaft;
wherein the second shaft is a hollow first structure that is further defined with an inner diameter;
wherein the first shaft is a second structure that is further defined with an outer diameter;
wherein the outer diameter of the first shaft is less than the inner diameter of the second shaft such that the first shaft can be inserted into the second shaft in a telescopic arrangement;
wherein the length of the telescopic pole to be adjusted by adjusting the relative position of the first shaft within the second shaft;
wherein the position of the first shaft relative to the second shaft is held in position using the detent;
wherein the detent is a mechanical device;
wherein the detent connects and secures the first shaft to the second shaft;
wherein the detent is selected from the group consisting of a cotter pin, a G snap collar, a cam lock collar, a threaded clutch, a split collar lock, or a spring-loaded ball lock;
wherein the first end is the superior end of the first shaft;
wherein the second end is the inferior end of the first shaft;
wherein the third end is the superior end of the second shaft;
wherein the fourth end is the inferior end of the second shaft;
wherein the lamp attaches to the first end of the first shaft;
wherein the fourth end attaches to the superior surface of the clip such that the telescopic pole projects perpendicularly away from the clip in the superior direction.

2. The optical signaling device according to claim 1
wherein the flag is a sheeting material;
wherein the flag attaches to the telescopic pole using a single edge of the flag;
wherein the flag is a visible marker.

3. The optical signaling device according to claim 2
wherein the lamp is a light;

wherein the lamp is illuminated by the remote interface circuit;

wherein the lamp generates a light that draws attention to the vehicle.

4. The optical signaling device according to claim 3 wherein the wiring that connects the lamp to the remote interface circuit is threaded through the telescopic pole.

5. The optical signaling device according to claim 4 wherein the lamp is an LED.

6. The optical signaling device according to claim 5
wherein the remote interface circuit is an electrical circuit;
wherein the remote control circuit controls the operation of the lamp;
wherein the remote interface circuit forms a wireless connection with the user control;
wherein upon receipt of a signal from the user control the remote interface circuit illuminates the lamp.

7. The optical signaling device according to claim 6
wherein the remote interface circuit comprises a receiver housing, a receiver circuit, a relay, and a limit resistor;
wherein the receiver circuit, the relay, the lamp, and the limit resistor are electrically interconnected;
wherein the receiver housing is a rigid casing within which the balance of the remote interface circuit is contained.

8. The optical signaling device according to claim 7
wherein the receiver circuit is a radio frequency receiver receives a signal transmitted by the user control;
wherein the relay is an electrical relay;
wherein the relay is further defined with a relay switch and a relay coil;
wherein when the receiver circuit energizes the relay coil the relay switch is closed thereby powering and illuminating the lamp;
wherein the limit resistor is a resistor that limits the flow of electric current through the lamp;
wherein the receiver battery provides electrical power for the operation of the receiver circuit, the relay, and the lamp.

9. The optical signaling device according to claim 8
wherein the transmitter circuit is wired into the relay coil in order to energize the relay coil;
wherein the relay switch is wired in series between the receiver battery and the anode of the LED;
wherein the limit resistor is wired in series between the cathode of the led that forms the lamp and the negative terminal of the receiver battery.

10. The optical signaling device according to claim 9
wherein the user control comprises a transmitter housing, a transmitter circuit, a switch, and a transmitter battery;
wherein the transmitter circuit, the switch and the transmitter battery are electrically interconnected in a series circuit;
wherein the transmitter housing is a rigid casing within which the balance of the user control is contained.

11. The optical signaling device according to claim 10
wherein the transmitter circuit is a radio frequency transmitter that transmits a signal to the receiver circuit of the remote interface circuit;
wherein the signal transmitted by the transmitter circuit initiates the illumination of the lamp by the remote interface circuit;
wherein the switch is a normally open momentary switch.

12. The optical signaling device according to claim 11 wherein the transmitter circuit, the transmitter battery, and the switch are electrically connected in a series circuit.

* * * * *